United States Patent
Radke, Jr.

(10) Patent No.: US 6,374,753 B1
(45) Date of Patent: Apr. 23, 2002

(54) PALLET AND PROCESS FOR MAKING THEREOF

(76) Inventor: Dan R. Radke, Jr., 8213 Tivoli Cove Dr., Las Vegas, NV (US) 89128

( * ) Notice: Subject to any disclaimer, the term of this patent is extended or adjusted under 35 U.S.C. 154(b) by 0 days.

(21) Appl. No.: 08/680,476

(22) Filed: Jul. 15, 1996

Related U.S. Application Data

(63) Continuation-in-part of application No. 08/326,926, filed on Mar. 15, 1995, now abandoned.

(51) Int. Cl.[7] .......................... B65D 19/26; B29C 43/00
(52) U.S. Cl. ................... 108/51.11; 108/901; 264/122; 264/912
(58) Field of Search ................................ 428/218, 292; 108/51.11, 57.25, 901; 264/109, 122, 128, 349, 911, 912

(56) References Cited

U.S. PATENT DOCUMENTS

| | | | | |
|---|---|---|---|---|
| 4,248,163 A | * | 2/1981 | Caughey | 264/119 |
| 4,795,603 A | * | 1/1989 | Nagayasu | 264/912 |
| 5,094,905 A | * | 3/1992 | Murray | 428/218 |
| 5,106,554 A | * | 4/1992 | Drews | 264/912 |
| 5,238,734 A | * | 8/1993 | Murray | 428/292 |
| 5,439,735 A | * | 8/1995 | Jamison | 264/912 |
| 5,732,192 A | * | 3/1998 | Jonasz | |

FOREIGN PATENT DOCUMENTS

GB          1586882       * 3/1981

* cited by examiner

Primary Examiner—Mathieu D. Vargot
(74) Attorney, Agent, or Firm—Steven N. Fox, Esq.

(57) ABSTRACT

The present invention is a pallet made from a combination of recycled tire shreds and recycled plastic particles. In one embodiment, the pallet comprises a plurality of recycled tire shreds having different surface areas, a plurality of recycled plastic flakes having different surface areas, and a bonding agent coated about substantially all of the surfaces of the recycled tire shreds and the recycled plastic flakes. The combination of the recycled tire shreds having different surface areas, the recycled plastic particles having different surface and the bonding agent results in a stronger and durable pallet.

4 Claims, 3 Drawing Sheets

PALLET AND PROCESS FOR MAKING THEREOF

This application is a continuation-in-part of application Ser. No. 08/326,926 filed on Mar. 15, 1995, now abandoned

FIELD OF THE INVENTION

The present invention relates generally to a commercial product and a process for making the same. More specifically, the present invention relates to a process and product manufactured from recycled materials.

BACKGROUND OF THE INVENTION

The benefits of recycling certain commercial products is well known. For example, the recycling of plastic bottles and aluminum cans has become common place. The recycling of these product protects the environment as well as conserves energy.

However, there are commercial products which are not recycled. One such product is that of the automobile tire. With the increased use of automobiles and other equipment, the amount of tires used and then discarded approaches astronomical levels. In the past years, tires have for example been buried in landfills along with other waste products. In recent years, however, there is has been a need to develop other more environmental friendly process to dispose of scrap tires. In this regard, processes have been developed to incinerate the tires to thereby recover oil compounds from the rubber. Such processes, however, have met with some resistance in that the incineration process itself is not compatible with the environment.

One object of the present invention is to develop a commercial product made from scrap tires and a process for manufacturing the same.

SUMMARY OF THE PRESENT INVENTION

The present invention is a commercial product made from whole tires and plastic material and a process for manufacturing the same. In one embodiment, the product is that of a commercial pallet used for storing and transporting items which is made from a combination of recycled tire shreds and recycled plastic particles. In one embodiment, the pallet comprises a plurality of recycled tire shreds having different surface areas, a plurality of recycled plastic particles having different surface areas, and a bonding agent coated about substantially all of the surfaces of the recycled tire shreds and the recycled plastic particles. In operation, the combination of the recycled tire shreds having different surface areas, the recycled plastic particles having different surface and the bonding agent results in a stronger and durable pallet. The present invention is also a process for manufacturing a pallet from a combination of recycled tire shreds and recycled plastic particles which in one embodiment comprises the steps of creating a mixture of a plurality of different sized recycled tie shreds and a plurality of recycled plastic particles, adding a bonding agent to said mixture to thereby coat all surfaces of the different sized recycled tire shreds and the different sized recycled plastic particles; transferring said mixture after said bonding agent has been added into one or more molds which correspond to the pallet, applying heat and pressure to said mixture within the mold for a predetermined period of time, and curing the mixture after said step of heating and applying pressure.

BRIEF DESCRIPTION OF THE DRAWINGS

The following detailed description of the invention will be better understood with reference to the accompanying drawings in which.

DETAILED DESCRIPTION OF THE PREFERRED EMBODIMENTS

The present invention is a commercial product made from whole tires and plastic material and a process for manufacturing the same which is one embodiment is that of a a commercial pallet (not shown). The pallet may be used for storing and transporting items. The pallet generally comprises recycled tire shreds made from whole tires wherein the tire shreds are substantially free from wire and fiber. The pallet further comprises plastic shreds made from plastic products. The pallet further comprises an epoxy mixture to bind the tire and plastic shreds into a mold material.

Figure 1:
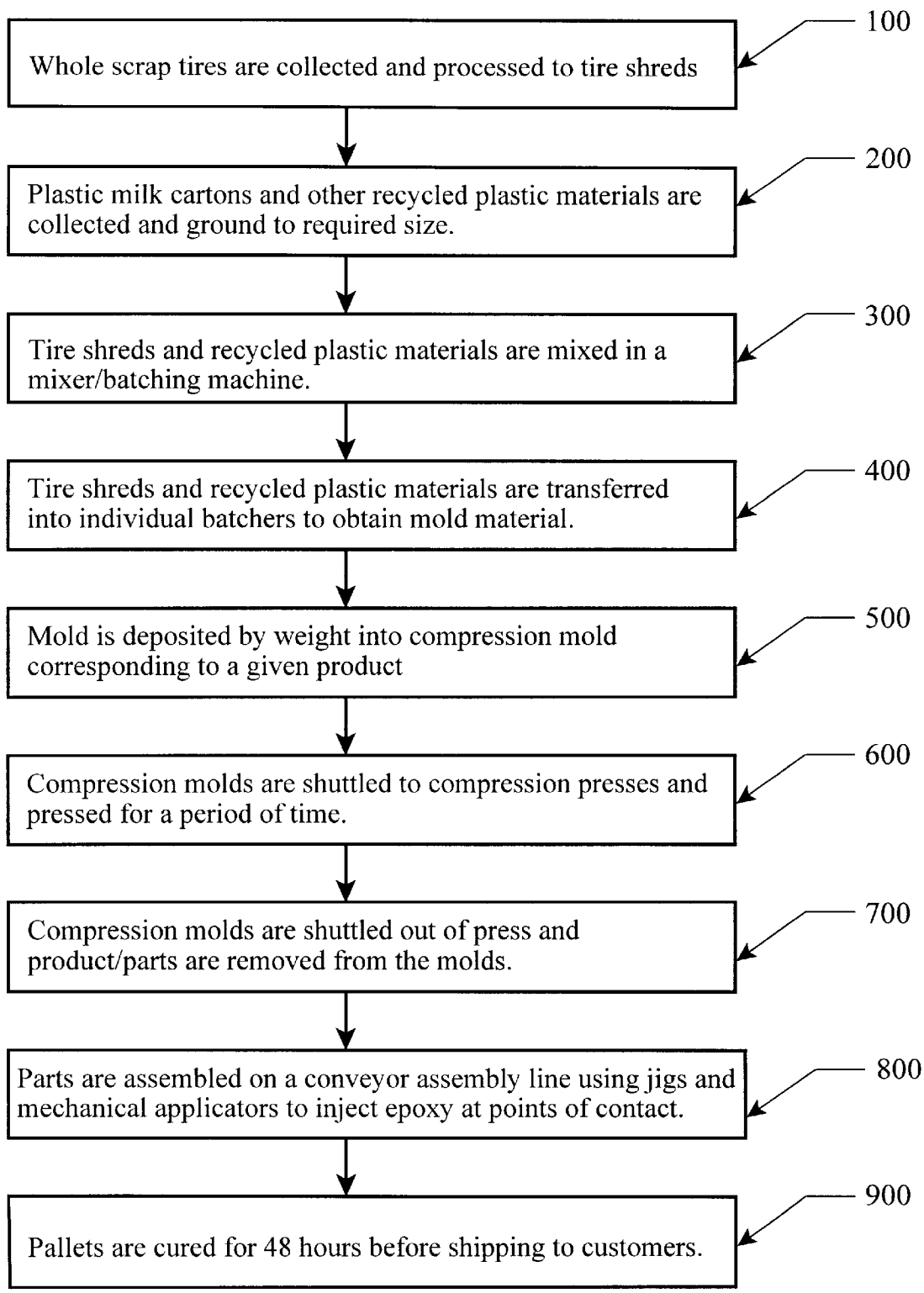
FIG. 1 is a high level flow chart showing one embodiment of the process of the present invention for manufacturing products of the present invention.
Figure 2:
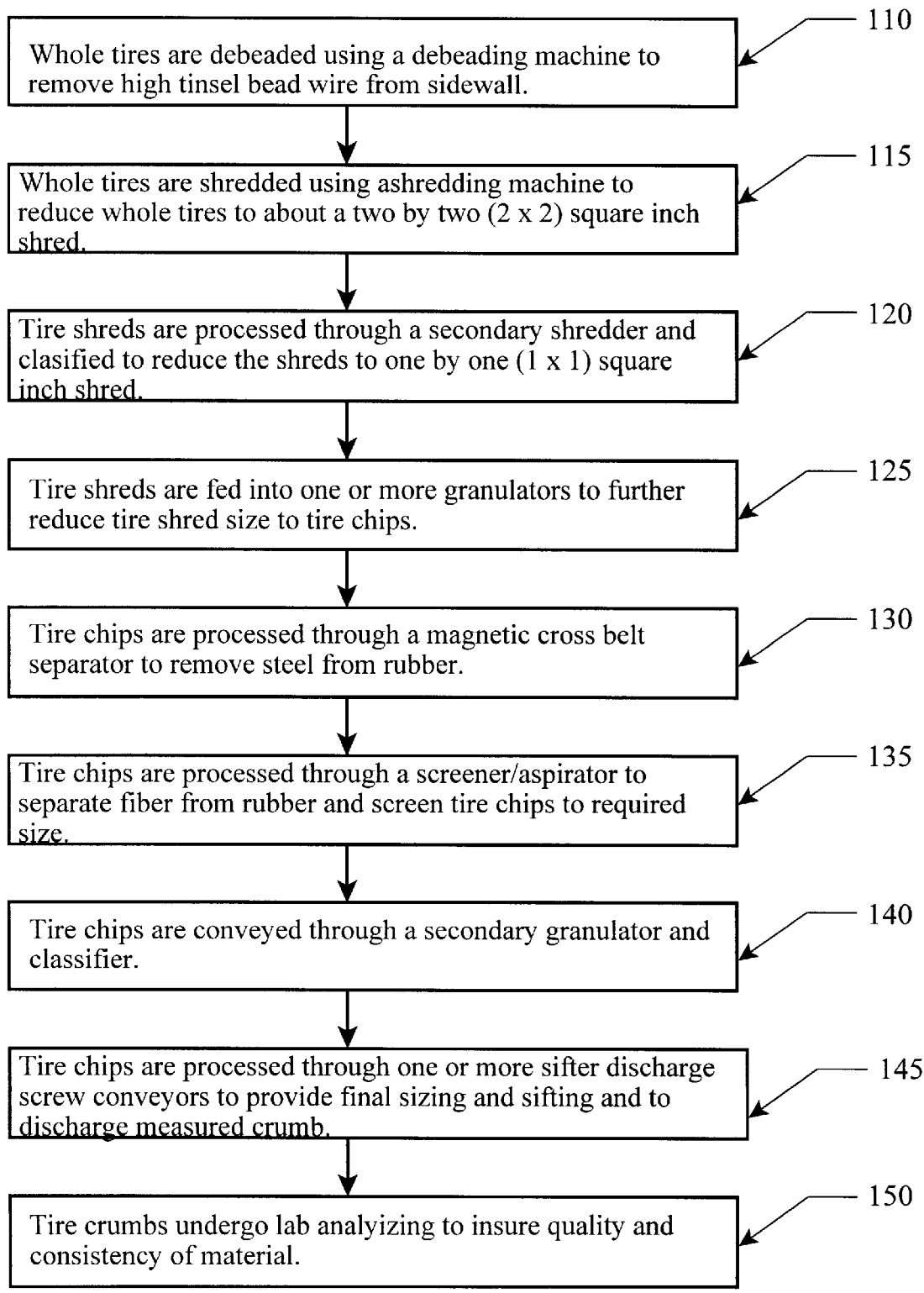
FIG. 2 is a flow chart showing one step of the process of FIG. 1.
Figure 3:
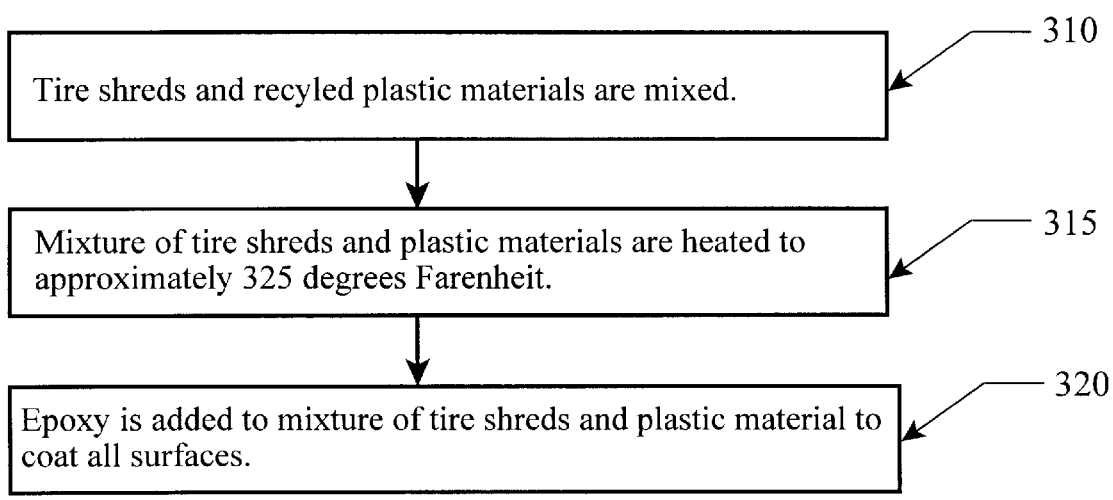
FIG. 3 is a flow chart showing a one step of the process of FIG. 1.

FIGS. 1–3 show one embodiment of the process of the present invention for making the commercial product or pallet. Referring to FIG. 1, wherein a high level block diagram show the process of the invention. As shown by block 100, the process of the present invention generally comprises the first step of collecting whole scrap tires and processing the same into usable tire shreds. As shown by block 200, the next step of the process is to collect plastic products and processing the same into usable plastic shreds. As shown by block 300, the next step of the process is to mix the tire and plastic shreds in a large mixer/batching machine. As shown by block 400, the next step of the process is to move the tire and plastic shred mixture into individual batchers where mixture is mixed and epoxy is added to coat all surfaces. As shown by block 500, the next step of the process is to deposit the mold material by weight into specialty compression mold. As shown by block 600, the next step of the process is to transport the molds into the specialty compression presses where the molds are pressed for a period of time. As shown by block 700, the next step of the process is to remove the molds from the press and remove the parts from the molds. As shown by block 800, the next step of the process is to assemble the product on a conveyor assembly line. As shown by block 900, the next step of the process is to allow the pallets to cure before shipping to customers.

Referring to FIG. 2, wherein a high level block diagram describes step 100 of collecting whole scrap tires and processing the same into usable tire shreds. As shown by block 110, the first step is to debead whole tires to remove high tinsel bead wire from the sidewall of the tire. This step may be accomplished by using debeading machines.

As shown by block 115, the next step is to shred the whole tires into pieces having dimensions of approximately two inches by two inches. This step may be accomplished by using a shredding machine.

As shown by block 120, the next step is to process the two inch by two inch shreds through a secondary shredder and classifier to reduce the tire shreds to a dimension of one inch by on inch.

As shown by block 125, the next step is to feed the tire shreds into granulators to further reduce the shred size into tire chips.

As shown by block 130, the next step is to process the tire chips through a magnetic cross belt separator to remove steel from rubber.

As shown by block 135, the next step is to process the tire chips through a screener/aspirator to separate the fiber from the rubber and to screen the tire chips to the required size.

As shown by block 140, the next step is to process the tire chips through a secondary granulator and classifier to form tire crumbs.

As shown by block 140, the next step is to process the tire chips through a series of sifter discharge screw conveyors to provide final sizing and sifting to discharge a measured tire crumb.

As shown by block 145, the final step is to inspect the tire crumbs using analyzing equipment to insure quality and consistency of the material.

Referring to FIG. 2, wherein a high level block diagram describes step 300 of mixing the tire and plastic shreds in a large mixer/batching machine. As shown by block 310, the tire shreds and plastic shreds are mixed. As shown by block 315, the tire and plastic shred mixture is heated to about 325 degree Fahrenheit. As shown by block 320, an epoxy based material is added to the tire and plastic shred mixture to thereby form a molding material.

The pallet is preferably made from a combination of a plurality of different sized recycled tire shreds and a plurality of different sized recycled plastic flakes. Use of different sized tire shreds in combination with the use of different sized recycled plastic flakes allow a bonding agent to be used to effectively cover all of the surface area of the recycled tire shreds and recycled plastic flakes. The result is a pallet having a high mass density and lack of voids which thereby provides a strong and durable pallet. Following are various compositions of the tire shreds, plastic flakes and bonding agent and the molding process used to construct the pallet of the present invention:

The tire shreds are available from licensed scrap tire recycling firms void of any wire or steel such as E.R.R.I. Recycling of Stamford, Tex. free of any wires. The recycled plastic flakes are available from licensed plastic recyclers such as Orion Pacific Plastic Recyclers of Midland, Tex. The bonding agent is preferably 100% solids and VOC (volatile organic compound) free and is available from Copps Industries, Inc., 10600 N. Industrial Drive, Mequon, Wis.

The foregoing description is intended primarily for purposes of illustration. This invention may be embodied in other forms or carried out in other ways without departing from the spirit or scope of the invention. Modifications and variations still falling within the spirit or the scope of the invention will be readily apparent to those of skill in the art.

What is claimed is:

1. A pallet made from a combination of recycled tire shreds and recycled plastic particles, the pallet comprising:
    a) a plurality of recycled tire shreds having different surface areas;
    b) a plurality of recycled plastic flakes having different surface areas; and
    c) a bonding agent coated about substantially all of said surfaces of said recycled tire shreds and said recycled plastic flakes,
        whereby the combination of said recycled tire shreds having different surface areas, and said recycled plastic flakes having different surface areas allow said bonding agent to effectively cover substantially all of the surface areas of the recycled tire shreds and the surface areas of the recycled plastic flakes to form a pallet having a high mass density and lack of voids thereby providing a strong and durable pallet.

2. The pallet of claim 1, wherein said recycled tire shred comprise:
    a) 35% of recycled tire shreds having about a ¾ square inch surface area;
    b) 20% of recycled tire shreds having about a ½ square inch surface area;

|  | Relative Weight % | Relative Weight % | Relative Weight % | Relative Weight % |
|---|---|---|---|---|
| Combination of Recycled Tire Shred Size | | | | |
| ¾ inch | 35% | 50% | 50% | 60% |
| ½ inch | 20% | 30% | 30% | 40% |
| ¼ inch | 20% | 10% | 20% | 0% |
| 10/30 mesh crumb | 10% | 10% | 0% | 0% |
| Tire Buffings From Retreads | 15% | 0% | 0% | 0% |
| Combination of Recycled HDPE Flake Size | | | | |
| ¼ inch | 60% | 50% | 70% | 80% |
| ⅛ inch | 40% | 50% | 30% | 20% |

| Recyled Tire Shred (Weight %) | Recyled HDPE Flakes (Weight %) | Industrial Epoxy (Weight %) | Temperature (F) | Pressure (PSI) | Molding Time w/Pressure (Min) | Cure Time (Hours) |
|---|---|---|---|---|---|---|
| 70% | 12% | 18% | 350 | 120 | 12 | 168 |
| 75% | 8% | 17% | 350 | 120 | 12 | 168 |
| 75% | 15% | 10% | 400 | 140 | 10 | 168 |
| 80% | 8% | 12% | 400 | 140 | 8 | 168 |
| 65% | 20% | 15% | 375 | 120 | 10 | 168 | c) 10% of recycled tire shreds having about a ¼ square inch surface area;

d) 20% of recycled tire shreds having about a 10/30 square inch surface area; and e) 15% of recycled tire buffering.

3. The pallet of claim 2, wherein said recycled plastic particles comprise:

a) 60% flake HDPE of ¼ square inch size; and b) 40% flake HDPE of ⅛ square inch size.

4. A process for manufacturing a pallet from a combination of recycled tire shreds and recycled plastic particles, the process comprising the steps of:

(a) creating a mixture of a plurality of different sized recycled tire shreds and a plurality of different sized recycled plastic flakes; and (b) adding a bonding agent to said mixture to thereby coat all surfaces of said different sized recycled tire shreds and said different sized recycled plastic flakes;

(c) transferring said mixture after said bonding agent has been added into one or more molds which correspond to the pallet;

(d) applying heat and pressure to said mixture within the mold for a predetermined period of time; and (e) curing the mixture after said step of heating and applying pressure, whereby the combination of said recycled tire shreds having different surface areas and said recycled plastic flakes having different surface areas allow said bonding agent to effectively cover substantially all of the surface areas of the recycled tire shreds and the surface areas of the recycled plastic flakes to form a pallet having a high mass density and lack of voids thereby forming a strong and durable pallet.

* * * * *